US006493551B1

(12) United States Patent
Wang et al.

(10) Patent No.: US 6,493,551 B1
(45) Date of Patent: Dec. 10, 2002

(54) GSM MOU BYPASS FOR DELIVERING CALLS TO GSM SUBSCRIBERS ROAMING TO CDMA NETWORKS

(75) Inventors: Jin Wang, Lisle; Patuardhana Babu Gorrepati, Naperville, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/398,844

(22) Filed: Sep. 17, 1999

(51) Int. Cl.⁷ ................................................. H04Q 7/20
(52) U.S. Cl. ...................... 455/432; 455/406; 455/417; 709/249
(58) Field of Search ................................. 455/406, 417, 455/432; 709/249

(56) References Cited

U.S. PATENT DOCUMENTS 5,862,481 A * 1/1999 Kulkarni et al. ............ 455/432
6,185,198 B1 * 2/2001 LaDue ....................... 370/329
6,314,284 B1 * 11/2001 Patel et al. ................. 455/417

OTHER PUBLICATIONS

Diffie, W. and Hellman, M., "New Directions in Cryptography," *IEEE Transactions on Information Theory*, vol. IT–22, Nov. 1976, pp. 644–654.

Perkins, "IP Mobility Support", Network Working Group, RFC 2002, Oct. 1996.

Droms, "Dynamic Host configuration Protcol", Network Working Group, RFC 2131, Mar. 1997.

"A Primer of the H.323 Series Standard", DataBeam Corporation, May 15, 1998.

"Packet–Based Multimedia Communications Systems" Series H: Audiovisual and Multimedia Systems—Infrastructure of audiovisual services—Systems and terminal equipment for audiovisual services, International Telecommunications Union, ITU–T Recommendation H.323 (2/98).

* cited by examiner

*Primary Examiner*—Daniel Hunter
*Assistant Examiner*—Alan T. Gantt
(74) *Attorney, Agent, or Firm*—Sitrick & Sitrick (57) ABSTRACT

Method and system integrating wireless/wireline and circuit/packet networks (to bypass GSM Memorandum of Understandings) for cellular/PCS services so that GSM subscribers roaming into CDMA networks can be provided with basic wireless call delivery services as long as the roamers can pay the bill with their valid credit card. This is achieved by integrating wireless and wireline networks as well as circuit and packet networks, using IP networks and protocols as an alternative to the existing telephony-based approach.

56 Claims, 4 Drawing Sheets

GSM MOU BYPASS FOR DELIVERING CALLS TO GSM SUBSCRIBERS ROAMING TO CDMA NETWORKS

RELATED APPLICATIONS

Not Applicable.

FEDERALLY SPONSORED RESEARCH OR DEVELOPMENT

Not Applicable.

BACKGROUND OF THE INVENTION

The present invention relates to cellular or wireless call delivery services provided by cellular/PCS operators. Call delivery service permits a cellular or wireless subscriber to receive phone calls either in a home network (e.g., London) or while away from the home network (e.g., in Chicago).

Global Systems for Mobile Communications (GSM) is a widely popular Time Division Multiple Access (TDMA)-based standard used in Europe. TDMA is a digital wireless technology.

A subscriber who roams to Code Division Multiple Access (CDMA) wireless networks may be denied wireless services even if the subscriber's mobile device is capable of dual-mode (CDMA or analog, and GSM) operation, and the subscriber has the ability to pay for wireless calls with his/her valid credit card. The basis for the denial of service is simply because there is a lack of a GSM Memorandum of Understanding (MoU) between the home GSM network and visited CDMA network for billing settlement.

1. Field of the Invention

The present invention relates to the field of Internet Protocol as used to replace traditional telephony infrastructure for roaming wireless users. The present invention also relates to the field of providing mobile wireless telephone service for users roaming outside their own predefined service area. The present invention also relates to the field of inter-operability of CDMA and GSM/TDMA wireless networks.

2. Description of Related Art

A GSM MoU is an agreement between a consortium of GSM wireless service providers. For example, a subscriber of a first GSM service provider may roam to a service area controlled by a second GSM service provider. An established MoU allows the first GSM service provider to still serve the subscriber while that subscriber is in the service area corresponding to the second GSM service provider. In practice, the second GSM service provider gets paid a portion of the service/roaming charge the first GSM service provider charges the subscriber, which is one reason why wireless "roaming charges" are so expensive.

The Local Number Portability (LNP) feature could be used, to some extent, to bypass GSM MoU. LNP allows a telephone subscriber to "port" his/her phone number when that subscriber relocates to a different region of the country, even when the local area code may be different (e.g., a subscriber may reallocate from Chicago to New York, but still keep the original phone number used in Chicago which has an area code of 312).

However, LNP updates are not dynamic by design and thus can have serious limitations. A subscriber who wants LNP typically will request that service by filling out a form. The phone company's administrative staff will manually process the form and make necessary updates of various databases to effect the requested LNP. Note that LNP is designed to support occasional change of location/relocation, and is typically done manually, thus there is a scalability issue in practice.

Public Switched Telephony Network (PSTN) refers to the public phone networks as we know them. PSTN is composed of switches and T1/E1 trunks, central office, etc. PSTN uses circuit-switched technology, in which necessary resources are allocated (dedicated) for the duration of a phone call. An IP network (e.g., the Internet), in contrast, is composed of nodes of computers, serves, routers, and communications links, etc. It employs packet-switching technology which decomposes data (e.g., voice, web pages, an e-mail message) into IP packets. Each packet is then transmitted over an IP network to a destination identified by an IP address and reassembled at the destination. An IP transmission is completed without pre-allocating resources from point to point.

Dynamic Host Configuration Protocol (DHCP) service provides a dynamic IP address with a short term lease. DHCP is covered by RFC 2131. As of the date of this disclosure, RFC 2131 may be obtained from URL http://nic.mil/ftp/rfc/rfc2131.txt. The major use of DHCP is to support dynamic IP address assignment. For example, an ISP (Internet Service Provider) can use DHCP to dynamically assign an IP address to a subscriber after he/she logs in over a dial-up connection; once the session is over, the IP address is recycled for other dial-in users.

Mobile IP is described by Internet Engineering Task Force (IETF) Request for Comments (RFC) number 2002. As of the date of this disclosure, RFC 2002 may be obtained from URL http://nic.mil/ftp/rfc/rfc2002.txt. Unlike H.323, Mobile IP does supports packet mobility, but smooth handoffs—as smooth as circuit cellular voice—are not supported.

The Diffie-Hellman algorithm is a math method allowing two parties to establish a temporary secret for secure transmission of information. This technique is detailed in: Diffie, W. and Hellman, M., "New directions in cryptography," *IEEE Transactions on Information Theory*, Vol. IT-22, Nov. 1976, pp. 644–654.

BRIEF SUMMARY OF THE INVENTION

The present invention addresses the above issues of denial of service by combining and integrating the proper pieces of circuit and packet, and that of wireless and wireline. The present invention provides a way to bypass GSM MoU so that GSM users roaming into CDMA networks, having the ability to pay wireless calls with a credit card, can be provided with basic call delivery wireless services.

These and other aspects and attributes of the present invention will be discussed with reference to the following drawings and accompanying specification.

DETAILED DESCRIPTION OF THE PREFERRED EMBODIMENT

While the present invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Cellular telephone users generally subscribe to a cellular service provider. The subscriber may use their mobile devices within the home wireless network served by their wireless service provider in exchange for subscription fees. However, users also may travel, and thus need to have their mobile devices operate outside of their home wireless networks as they visit other areas.

Figure 1:
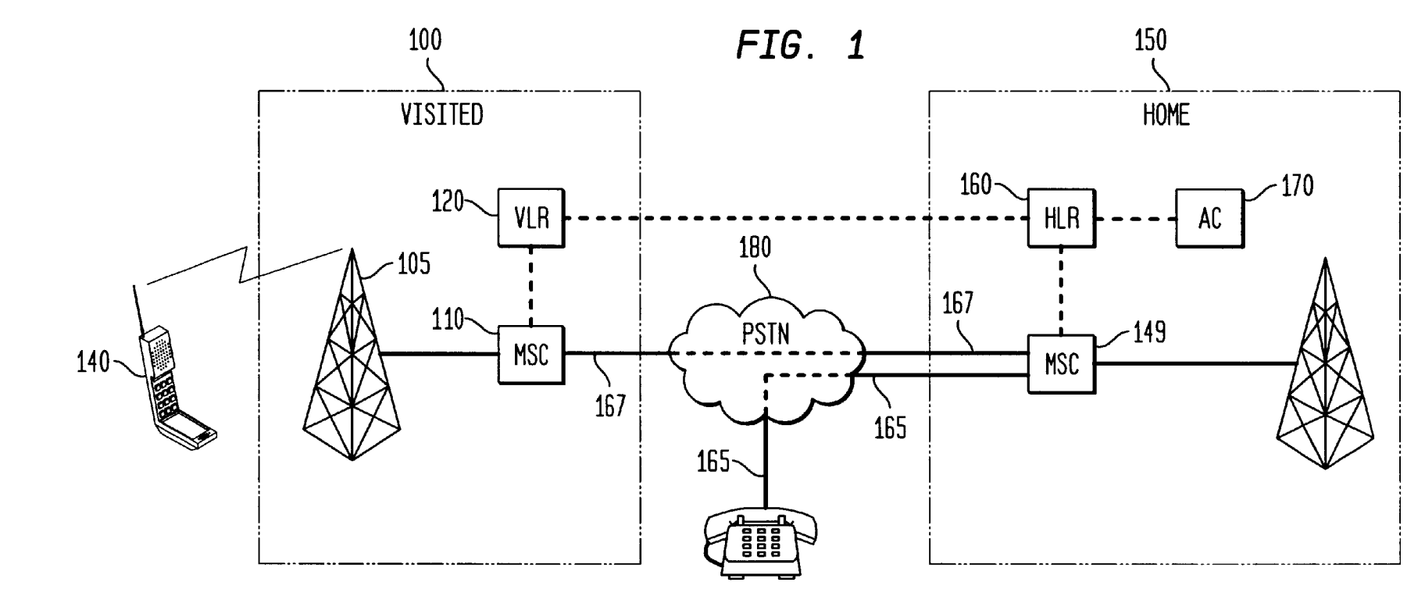
FIG. 1 represents a prior art typical infrastructure supporting call origination and call delivery.

FIG. 1 shows a typical wireless infrastructure that provides cellular/PCS services such as call origination and call delivery for a roaming mobile device. For call delivery, the visited network 100 tracks the location of a roaming mobile device 140 and the Visitors Location Register (VLR) 120 reports that location information to the Home Location Register (HLR) 160 typically via a GSM MAP network or an ANSI-41 network. An Authentication Center (AC) 170 in the home network 150 is used for user registration and authentication (e.g., checking to see, among other things, if the user has made payments). When an incoming call 165 is to be delivered to a subscriber, the HLR 160 is contacted first about the whereabouts of the current VLR 120, and the call is then redirected via links 167 and the Public Switched Telephony Network (PSTN) 180 to the Mobile Switching Center (MSC) 110 currently serving the mobile device.

An MSC is a telephone switch specialized for wireless and mobility support. An MSC performs various functions, including mobility management, call handoffs, call admission, call control, resource allocation, and so forth. The redirected call 167 is then relayed from the MSC 110 via wireless transmission from a base stations 105 to the mobile device 140.

Since the visited network 100 and home network 150 may be operated by different wireless operators, certain kinds of business roaming agreements are necessary for things like billing settlement. In GSM networks, a GSM Memorandum of Understanding (MoU) serves that purpose.

Table 1 summarizes the current cellular/PCS technologies and the network elements that are involved in call origination and call delivery.

A problem occurs when a GSM user, who roams to CDMA (or TDMA) networks, may not be provided with wireless services simply because there lacks a GSM Memorandum of Understandings (MoU) between the home GSM network and visited CDMA network. This is so even when the user's mobile device 140 is capable of dual-mode (CDMA or analog, and GSM) operation, and the user has the ability to pay for wireless calls (e.g., call delivery) with his/her valid credit card.

The present invention combines the following technical components to bypass GSM MoU for call delivery (i.e., incoming calls): use of IP to transport packet voice; use of the user's credit card as a payment method; and use of the Diffie-Hellman algorithm to encrypt the user's credit card information for over-the-air transmission.

The conversion of packet voice to circuit voice leverages the existing smooth handoff capability of circuit cellular voice and the well-engineered CDMA/TDMA circuit-mode air interface that provides superior efficiency of radio resource usage. The conversion also allows the roamer to receive call delivery with an existing cell phone or mobile device as opposed to having to purchase a new kind of "packet phone."

Figure 2:
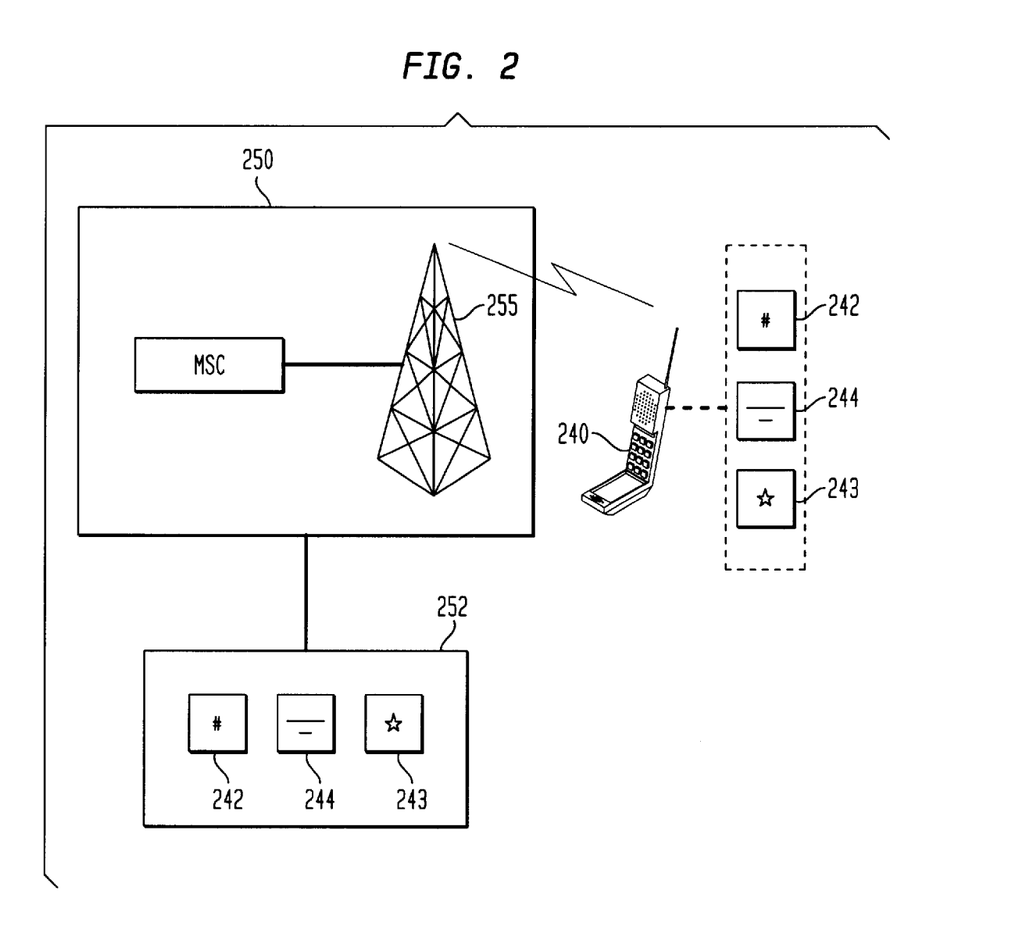
FIG. 2 represents the infrastructure supporting the first step of call delivery in accordance with the present invention.
Figure 3:
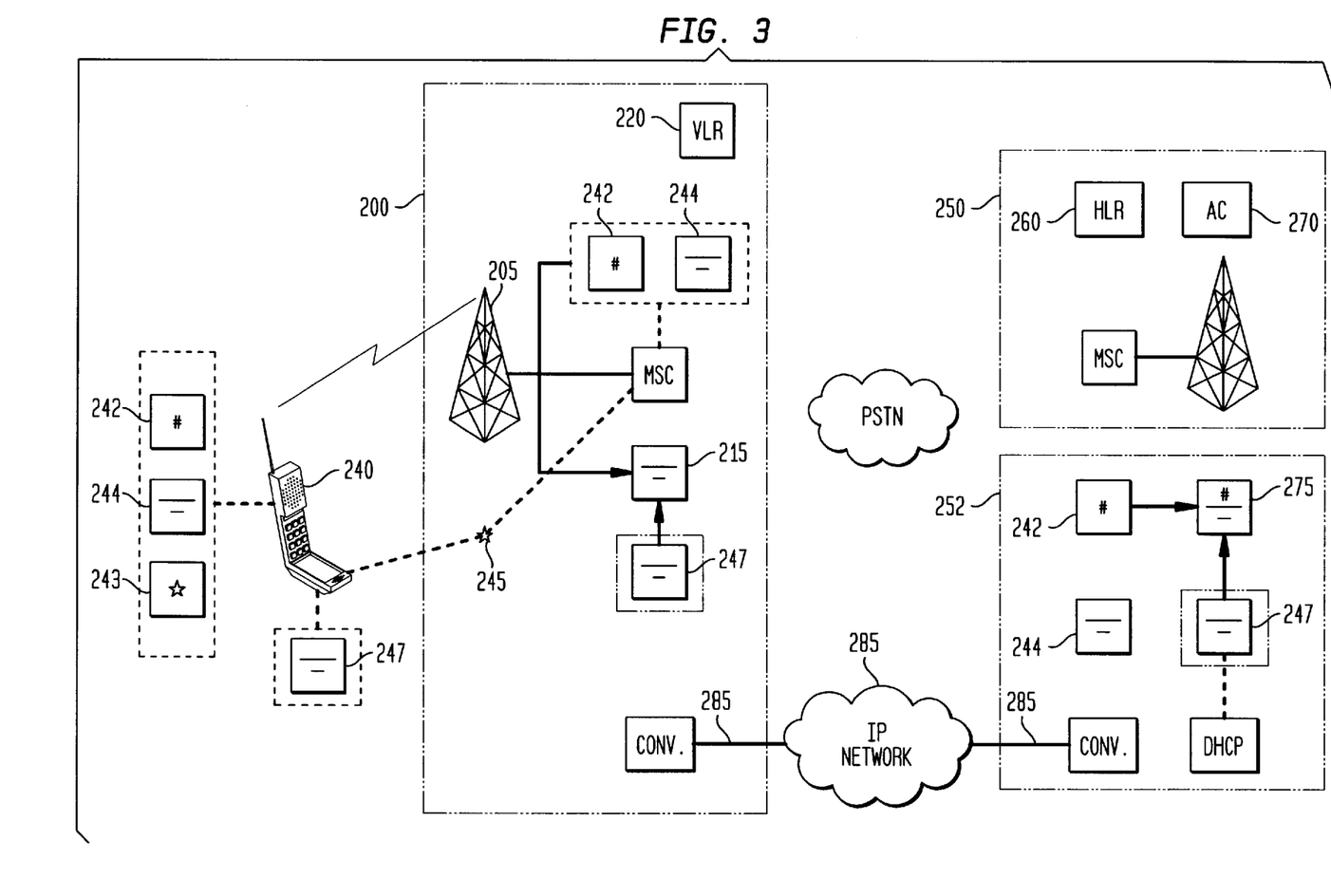
FIG. 3 represents the infrastructure supporting the second step of call delivery in accordance with the present invention.
Figure 4:
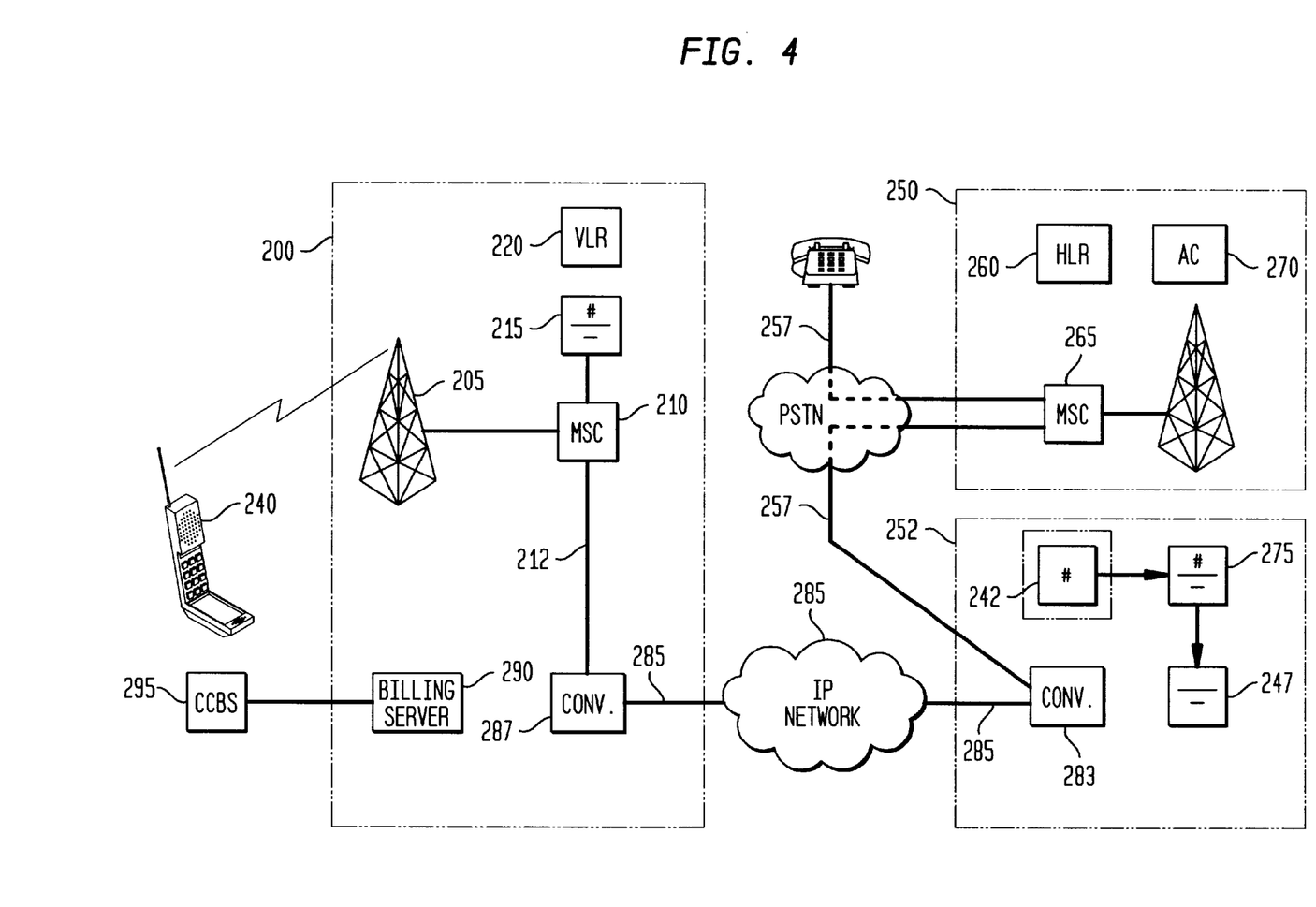
FIG. 4 represents the infrastructure supporting the third step of call delivery in accordance with the present invention.

FIGS. 2, 3, and 4 use many of the same reference numbers to identify common features; it is to be understood that where the same number is used, it refers to the same feature in each of the drawings.

FIG. 2 shows the first step of call delivery in one embodiment of the present invention, wherein prior to roaming the mobile user sets up call forwarding from the home wireless network 250. The home wireless service provider contacts a voice and data service provider's network 252, which provides (1) a telephone number 242 for call forwarding to the user's mobile device 240, (2) an IP address 244 within the voice and data service provider's network, and (3) a shared secret 243 between the mobile device and the voice and data service provider's network. These numbers 242, 243, and 244 are provisioned and stored within the user's mobile device. The IP address 244 allows the voice and data service provider's network 252 to be contacted via an IP network (e.g., the Internet).

FIG. 3 shows the second step of call delivery in one embodiment of the present invention, wherein the user's mobile device 240 is roaming in a visited wireless network 200. As the user powers on the mobile device 240, the mobile device registers with the visited wireless network 200. This registration permits the visited wireless network 200 to track the mobile's location and perform call delivery, but does not imply conventional VLR 220/HLR 260 interaction. In accordance with the present invention, the roamer's HLR 260 and the roamer's Authorization Center (AC) 270 of the home wireless network 250 are not contacted for call delivery. This registration conveys the mobile device's International Mobile Subscriber Identification (IMSI), the

TABLE 1

| Cellular Value Proposition | Current Supporting Cellular/PCS Technologies |
| --- | --- |
| Wireless and mobility | Base stations, RF engineering, hard and soft handoffs |
| Wide Coverage Area | Automatic roaming across visited & home cellular networks using VLR/HLR/AC<br>US: ANSI-41 and business roaming agreements<br>GSM: GSM MAP and GSM Memorandum of Understandings |
| Reliable services of both voice/data call origination voice/data call delivery | Call origination: involves VLR, HLR, and AC for service qualification, user service profile, and billing.<br>Call delivery: involves VLR and HLR for mobile location tracking, Temporary Local Directory Number (TLDN) assignment, call forwarding/routing, and billing. | forwarding phone number 242, and the IP address 244 to the visited MSC 210.

With the roamer's IMSI, forwarding number 242, and IP address 244, the visited MSC 210 identifies the user's mobile device 240 as a special phone supporting the present invention. This special identification aborts the conventional VLR/HLR interaction.

The visited MSC 210 and the user's mobile device 240 interact with each other to establish a temporary shared secret 245 using the Diffie-Hellman algorithm. This mechanism is also used in Cellular Digital Packet Data (CDPD) networks typically used for low speed packet data services. The user's credit card information is transmitted from the mobile device to the visited network via wireless communication with base stations 205 using the established temporary shared secret 245. The temporary shared secret permits the sensitive information of the user's credit card information to be relayed to the visited wireless network 200 securely.

The credit card information can be entered by the user on the phone keypad, or via a swipe of the card through a card reader slot on the phone, or via some other means. In one embodiment, the credit card information is optionally stored within the mobile device. In another embodiment, the credit card information must be entered by the user for each use. In another embodiment, the user selects a credit card number from a list to be used for the outgoing call. The credit card number may belong to the user, the user's employer, or another third party. The credit card number thus relayed securely is then verified by the visited network's billing server to ensure it is valid, using methods familiar to anyone exposed to credit card payments and transactions and thus not detailed herein.

After credit card verification, the visited MSC 210 contacts the voice and data service provider's network 252 using the IP address 244. A request is made to set up an IP connection 285 between the user's mobile device and the voice and data service provider's network 252 which is signed using the Mobile IP shared secret 243, which permits the voice and data service provider's network to authenticate the request. Authentication is required because otherwise it would be possible for a third party to fraudulently impersonate the user's mobile device, thus denying service to the user. Upon authentication, the voice and data service provider's network assigns a dynamic IP address 247 to the user's mobile device 240 via DHCP and relays it to the user's mobile device.

Upon assignment of the dynamic IP address 247, the voice and data service provider's network 252 updates its phone-number-to-IP-address table 275 that maps the user's forwarding phone number 242 to the dynamic IP address 247 now assigned to the user's mobile device 240. Mobile IP binding tables, which are discussed at length in RFC 2002, permit tracking the location of the user's mobile device as it registers with various visited wireless networks.

The visited wireless service provider similarly updates its IP-address-to-phone-number table 215 that maps the dynamic IP address of the mobile 247 to the forwarding phone number 242 provided by the home wireless service provider. When both wireless service providers' tables 215, 275 are updated and the IP connection 285 is established, the setup for the PSTN bypass is complete.

FIG. 4 shows the last step of call delivery in one embodiment of the present invention. An incoming call 257 to the user is forwarded by the home MSC 265 using the forwarding phone number 242 and thus to the voice and data service provider's network 252. The voice and data service provider's network 252 looks up the phone number 242 in its phone-number-to-IP-address table 275 and finds the dynamic IP address 247 that has been assigned to the user's mobile device 240. In a preferred embodiment, additional routing information (e.g., the IP address of the conversion server 287, or a preferred route for IP connection 285) are also maintained and utilized for data packet forwarding by the voice and data service provider's network.

The voice and data service provider's network 252 converts via conversion server 283 the circuit call to a packet call (i.e., voice-over-IP) and forwards the packets via the IP connection 285 to the visited wireless network. In a preferred embodiment, the PSTN bypass is an IP network such as the Internet. In alternate embodiments, the PSTN bypass may be a private IP network, or a combination of both private networks and the public Internet. In another embodiment, the PSTN bypass may be implemented as an IP tunnel through the public Internet and/or private IP networks. Further, the IP network and/or IP tunnel may be layered on top of a different network infrastructure, in a manner consistent with current practice.

An IP tunnel is a specific case of a general network tunnel, which typically has two ends, and encapsulates packets of a first protocol for transmission from the first end to the second end of the tunnel using a potentially different second protocol for actual routing and delivery. Setting up a network tunnel generally involves a server or agent setting up each end prior to use. IP tunneling allows Internet standard-based routers to route IP packets from one end of a tunnel to the other end of the tunnel, regardless of the topology of the underlying IP network. A detailed technical discussion of IP tunneling may be located in RFC 2002 which pertains to support of Mobile IP.

The visited wireless network 200 looks up the dynamic IP address 247 in its IP-address-to-phone-number table 215 and finds the phone number 242 that has been assigned to the user's mobile device 240 for roaming.

The visited wireless network 200 converts via conversion server 287 the packets received via the IP connection 285 to a circuit call 212 and relays the circuit call to the visited MSC 210. The visited MSC 210 forwards the circuit call 212 on to the base stations 205 for over-the-air transmission to the user's mobile device 240.

In a preferred embodiment, the conversion servers 283, 287 are respective servers in the voice and data service provider's network and the visited wireless network which comply to the H.323 standards, which perform both packet-to-circuit and circuit-to-packet conversions in both locations 200, 252, thus supporting speaking by either the calling or called party. H.323 is a list of standards that supports voice over IP. As of the date of this disclosure, the URL http://www.databeam.com has further information on the H.323 standards. In this embodiment, packet data is conveyed in both directions over the IP connection 285, and is converted appropriately to circuit calls by the H.323 servers at each end appropriately for interface to wireless (or in the case of the home network, wireline) communications.

When the call is terminated, billing information is collected in the visited network's billing server 290. The billing information may include but is not limited to at least one of the duration of the call, which PSTN bypass was used, which credit card number was used, time and date, and other kinds of billing data. At the end of a billing period, or when the accumulated bill amount exceeds some predetermined amount, or when additional services or processing fees may be imposed, or at some other preferential time, the visited network's billing server 290 interacts with the credit card's billing server 295 for billing settlement, using the traditional and well-understood practices for accounting for services rendered. In accordance with the present invention, the roamer's HLR 260 and the roamer's AC 270 are not contacted for call delivery by the VLR 220.

The system of the present invention provides basic wireless call delivery service. The user must have a mobile device and subscribe to a home wireless service provider. The home wireless service provider serves a home wireless network. When the user travels to visit an area outside the home wireless network that action is called roaming.

Visited wireless service providers serve visited wireless networks, which are distinct and separate from the home wireless network. If there does not exist a pre-arranged Global Systems for Mobile Communications (GSM) Memorandum of Understanding (MoU) between the home wireless service provider and the visited wireless service provider, but the user does have a payment means to pay for the basic wireless call delivery service, the invention permits basic wireless delivery service.

The preferred embodiment of the present invention includes payment identification means. The payment identification means is for identifying the user's payment means to the visited wireless service provider. The preferred embodiment also includes a Public Switched Telephony Network (PSTN) bypass for conveying data as packet data independently of an existing PSTN, and also independently of a GSM MAP network or an ANSI-41 network. This allows for potential cost savings by not using the existing PSTN infrastructure and supporting networks to carry the call and call setup information.

The preferred embodiment of the present invention includes delivery service means for providing basic wireless call delivery service via the PSTN bypass. The delivery service means is typically responsive to the payment identification means. The system may also include collection means for collecting billing information from the visited wireless network by the visited wireless service provider. This billing information typically originates from the delivery service means. The system may further include billing means for billing the user by the visited wireless service provider. The billing amounts are typically determined by the collection means and also usually rely on the payment identification means.

The PSTN bypass may be any embodiment of network, including an IP network. The PSTN bypass may also incorporate an IP tunnel, which may tunnel through an IP network or another kind of network.

The payment means of the present invention preferably comprises credit card information. Typically, the credit card information is relayed securely from the user's mobile device to the visited wireless network. The secure relay can be accomplished by establishing a Diffie-Hellman temporary shared secret between the user's mobile device and the visited wireless network. The shared secret permits secure transmission of the user's credit card information to the visited wireless service provider via the visited wireless network. Upon receipt, the visited wireless service provider is then able to verify the validity of the user's credit card information.

The credit card information may be stored within the user's mobile device. The user may enter the information using a keypad, or with a card reader, swiper, or scanner. Alternatively, a third party may enter the information, or the mobile device may be pre-programmed with the information. The system of the present invention may also include an IP connection means to establish the PSTN bypass via an IP network.

The system of the present invention may utilize a circuit conversion means to convert circuit calls destined for the user's mobile device to packets for conveyance via the IP connection means. If so, it also includes packet conversion means to convert the packets conveyed by the IP connection means back to a circuit call for delivery to the user's mobile device. In the preferred embodiment the circuit conversion means is typically an H.323 server. The packet conversion means is also typically an H.323 server in the preferred embodiment.

The system of the present invention may also include lookup tables or database systems that include a phone-number-to-IP-address table in the home wireless network and an IP-address-to-phone-number table in the visited wireless network. If these tables are present, the system preferably includes means to update each of these tables.

The system of the present invention may also include a forwarding means for setting up call forwarding in the home wireless network. Typically, the home wireless service provider sets up call forwarding for the user. This setup may include obtaining a telephone number for call forwarding from the home wireless network. The setup may also include obtaining an IP address corresponding to the home wireless service provider, or some subsystem supplied by the home wireless service provider. These pieces of data are typically sent to and stored within the user's mobile device. The system also may include Dynamic Host Configuration Protocol (DHCP) to obtain a dynamic IP address from the home wireless service provider.

The system of the present invention also may include a Public Switched Telephony Network (PSTN) bypass means. This bypass typically includes a first end and a second end. This bypass is typically used for conveying packets in both directions between the first end and the second end.

The system of the present invention also may include delivery service means. The delivery service means is typically used for providing basic wireless call delivery service via the PSTN bypass means. The delivery service means typically only functions if the system knows the user has a means to pay for the service.

To allow the system of the present invention to know if the user has a means to pay for the service, the system may include a payment identification means for identifying the user's payment means. The visited wireless service provider typically collects and compiles billing information based on the delivery service, and subsequently bills the user based on that billing information.

The system of the present invention may also include a first end means to establish the first end of the PSTN bypass within the home wireless network. If so, it also typically includes a second end means to establish the second end of the PSTN bypass within the user's mobile device. In one embodiment, the present invention includes a circuit conversion means to convert circuit calls to the mobile device to packets for conveyance via the PSTN bypass, and a packet conversion means to convert the packets conveyed by the PSTN bypass to a circuit call. In a preferred embodiment, the circuit conversion means is an H.323 server and the packet conversion means is also an H.323 server.

The method of the present invention permits providing basic wireless call delivery service for a user having a mobile device and roaming to an area not covered by a GSM MoU. The method includes the step of registering with the user's home wireless service provider. The registration is to establish call forwarding within the home wireless network, among other things. The method also includes the step of identifying the user's payment means to the visited wireless service provider. The method utilizes a provided Public Switched Telephony Network (PSTN) bypass for conveying data as packet data independently of any existing PSTN.

The preferred method of the present invention also includes registering with the visited wireless service provider. This registration is to establish the PSTN bypass through to the user's mobile device, and determining how the user will pay for the service, among other things. The method includes the step of delivering calls to the user's mobile device via the PSTN bypass, collecting billing information, and billing the user for the service. The PSTN bypass of the present method can be an IP network or any other kind of network, and it can be implemented via an IP tunnel.

The method of the present invention can communicate the user's payment information, which may be credit card information, via a secure transmission. The transmission is made secure by the use of the Diffie-Hellman math method, which involves a shared secret between the user's mobile device and the visited wireless service provider.

The method of the present invention includes the step of registering with the user's home wireless service provider, which typically includes at least obtaining an IP address corresponding to the home wireless service provider and obtaining a telephone number for call forwarding from the home wireless network. It may also include storing this information in the user's mobile device.

The method of the present invention includes the step of registering with the visited wireless service provider, which typically includes at least obtaining a dynamic IP address from the home wireless service provider by the visited wireless service provider using DHCP. It may also include relaying the dynamic IP address from the visited wireless service provider to the user's mobile device, and establishing a PSTN bypass via an IP connection to the user's mobile device.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system to provide basic wireless call delivery service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged Global Systems for Mobile Communications (GSM) Memorandum of Understanding (MoU) between the home wireless service provider and the visited wireless service provider, and wherein the user has a payment means to pay for the basic wireless call delivery service, the system comprising:

payment identification means for identifying the user's payment means to the visited wireless service provider;

bypass means for conveying a voice call as packet data independently of an existing Public Switched Telephony Network (PSTN), an existing GSM MAP network, and an existing ANSI-41 network;

delivery service means for providing basic wireless call delivery service via the PSTN bypass, responsive to the payment identification means;

collection means for collecting billing information from the visited wireless network by the visited wireless service provider responsive to the delivery service means; and billing means for billing the user by the visited wireless service provider responsive to the collection means and the payment identification means.

2. The system as in claim 1, wherein the bypass means is an IP network.

3. The system as in claim 1, wherein the bypass means is an IP tunnel.

4. The system as in claim 1, wherein the user's payment means further comprises credit card information, and wherein the payment identification means further comprises:

payment shared secret means for establishing a Diffie-Hellman temporary shared secret between the user's mobile device and the visited wireless network;

secure transmission means for securely transmitting the user's credit card information to the visited wireless service provider via the visited wireless network responsive to the payment shared secret means; and verification means for verifying the validity of the user's credit card information by the visited wireless service provider responsive to the secure transmission means.

5. The system as in claim 4, wherein the credit card information is stored within the user's mobile device.

6. The system as in claim 4, wherein the user's mobile device further comprises data entry means to enter the user's credit card information to the user's mobile device.

7. The system as in claim 6, wherein the data entry means comprises a keypad.

8. The system as in claim 6, wherein the data entry means comprises a card reader.

9. The system as in claim 1, wherein the delivery service means further comprises:

IP connection means to establish the bypass means via an IP network;

circuit conversion means to convert circuit calls to the mobile device to packets for conveyance via the IP connection means; and packet conversion means to convert the packets conveyed by the IP connection means to a circuit call.

10. The system as in claim 9, wherein the circuit conversion means is an H.323 server.

11. The system as in claim 9, wherein the packet conversion means is an H.323 server.

12. The system as in claim 9, wherein the delivery service means further comprises:

a phone-number-to-IP-address table in a voice and data service provider's network; and an IP-address-to-phone-number table in the visited wireless network.

13. The system as in claim 12, wherein the delivery service means further comprises:

means to update the phone-number-to-IP-address table; and means to update the IP-address-to-phone-number table.

14. The system as in claim 9, wherein the IP connection means further comprises forwarding means for setting up call forwarding from the home wireless network to a voice and data service provider's network responsive to the user's mobile device, wherein the forwarding means comprises:

forwarding number means for obtaining, from the voice and data service provider's network, a telephone number for call forwarding, responsive to the user's mobile device; and IP means for obtaining an IP address corresponding to the voice and data service provider's network responsive to the user's mobile device.

15. The system as in claim 14, wherein the IP connection means further comprises Dynamic Host Configuration Protocol (DHCP) means for obtaining a dynamic IP address from the voice and data service provider's network.

16. A system to provide basic wireless call delivery service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged Global Systems for Mobile Communications (GSM) Memorandum of Understanding (MoU) between the home wireless service provider and the visited wireless service provider, the system comprising:

bypass means, comprising a first end and a second end, for conveying packets in both directions between the first end and the second end, independently of an existing Public Switched Telephony Network (PSTN), an existing GSM MAP network, and an existing ANSI-41 network;

delivery service means for providing basic wireless call delivery service via the bypass means, responsive to the payment identification means;

user's payment means for paying to the visited wireless service provider for basic wireless call delivery service;

payment identification means for identifying the user's payment means to the visited wireless service provider;

collection means for collecting billing information from the visited wireless network by the visited wireless service provider responsive to the delivery service means; and billing means for billing the user by the visited wireless service provider responsive to the collection means and the payment identification means.

17. The system as in claim 16, wherein the bypass means is an IP network.

18. The system as in claim 16, wherein the bypass means is an IP tunnel.

19. The system as in claim 16, wherein the user's payment means further comprises credit card information, and wherein the payment identification means further comprises:

payment shared secret means for establishing a Diffie-Hellman temporary shared secret between the user's mobile device and the visited wireless network;

secure transmission means for securely transmitting the user's credit card information to the visited wireless service provider via the visited wireless network responsive to the payment shared secret means; and verification means for verifying the validity of the user's credit card information by the visited wireless service provider responsive to the secure transmission means.

20. The system as in claim 19, wherein the credit card information is stored within the user's mobile device.

21. The system as in claim 19, wherein the user's mobile device further comprises data entry means to enter the user's credit card information to the user's mobile device.

22. The system as in claim 21, wherein the data entry means comprises a keypad.

23. The system as in claim 21, wherein the data entry means comprises a card reader.

24. The system as in claim 16, wherein the delivery service means further comprises:

first end means to establish the first end of the bypass means within the home wireless network;

second end means to establish the second end of the bypass means within the visited wireless network;

circuit conversion means to convert circuit calls to the mobile device to packets for conveyance via the bypass means; and packet conversion means to convert the packets conveyed by the bypass means to a circuit call.

25. The system as in claim 24, wherein the circuit conversion means is an H.323 server.

26. The system as in claim 24, wherein the packet conversion means is an H.323 server.

27. The system as in claim 24, wherein the delivery service means further comprises:

a phone-number-to-packet-address table in a voice and data service provider's network; and a packet-address-to-phone-number table in the visited wireless network.

28. The system as in claim 27, further comprising:

means to update the phone-number-to-packet-address table; and means to update the packet-address-to-phone-number table.

29. The system as in claim 27, wherein the first end means further comprises forwarding means for setting up call forwarding from the home wireless network to the voice and data service provider's network responsive to the user's mobile device.

30. The system as in claim 29, wherein the forwarding means further comprises:

forwarding number means for obtaining a telephone number, from the voice and data service provider's network, for call forwarding, responsive to the user's mobile device; and address means for obtaining the packet address corresponding to the voice and data service provider's network responsive to the user's mobile device.

31. The system as in claim 30, wherein the address means further comprises means for storing the packet address within the user's mobile device.

32. The system as in claim 30, wherein the second end means further comprises:

Dynamic Host Configuration Protocol (DHCP) means for obtaining a dynamic packet address from the voice and data service provider's network responsive to the address means;

relay means for relaying the dynamic packet address from the visited wireless network responsive to the user's mobile device.

33. A method to bypass Global Systems for Mobile Communications (GSM) Memorandum of Understanding (MoU) to provide basic wireless call delivery service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged GSM MoU between the home wireless service provider and the visited wireless service provider, and wherein the user has a payment means to pay for the basic wireless call delivery service, the method comprising:

registering with the user's home wireless service provider to establish forwarding from the home wireless network to a voice and data service provider's network;

identifying the user's payment means to the visited wireless service provider;

providing a bypass means for conveying a voice call as packet data independently of an existing Public Switched Telephony Network (PSTN), an existing GSM MAP network, and an existing ANSI-41 network;

registering with the visited wireless network to establish the bypass means through to the user's mobile device;

delivering calls to the user's mobile device via the bypass means;

collecting billing information from the visited wireless network by the visited wireless service provider; and billing the user by the visited wireless service provider responsive to the billing information collected and the user's identified payment means.

34. The method as in claim 33, wherein the bypass means is an IP network.

35. The method as in claim 33, wherein the bypass means is an IP tunnel.

36. The method as in claim 33, wherein the user's payment means comprises credit card information and wherein the step of identifying the user's payment means to the visited wireless service provider further comprises:

establishing a Diffie-Hellman temporary shared secret between the user's mobile device and the visited wireless network;

securely transmitting the user's credit card information to the visited wireless service provider via the visited wireless network using the temporary shared secret; and verifying the validity of the user's credit card information by the visited wireless service provider.

37. The method as in claim 36, wherein the step of securely transmitting the user's credit card information further comprises retrieving previously stored credit card information within the user's mobile device.

38. The method as in claim 36, wherein the step of securely transmitting the user's credit card information further comprises the user entering credit card information into the user's mobile device.

39. The method as in claim 33, wherein the step of registering with the user's home wireless network to establish forwarding from the home wireless network further comprises:

obtaining an IP address corresponding to the voice and data service provider's network; and obtaining a telephone number from the voice and data service provider's network for call forwarding.

40. The method as in claim 39, wherein the step of registering with the visited wireless service provider to establish the bypass means through to the user's mobile device further comprises:

obtaining a dynamic IP address from the voice and data service provider's network using Dynamic Host Configuration Protocol (DHCP);

relaying the dynamic IP address from the voice and data service provider's network via the visited wireless network to the user's mobile device; and establishing the bypass means via an IP connection between the visited wireless network and the voice and data service provider's network.

41. The method as in claim 40, wherein the step of establishing the bypass means via an IP connection further comprises:

updating an IP-address-to-phone-number table by the visited wireless network; and updating a phone-number-to-IP-address table by the voice and data service provider's network.

42. The method as in claim 40, wherein the step of delivering calls to the user's mobile device via the bypass means further comprises:

conversion of a circuit call for delivery to packets by the voice and data service provider's network;

forwarding the packets via the established bypass means;

reassembling the forwarded packets into a reassembled circuit call by the visited wireless network; and transmitting the reassembled circuit call over-the-air to the user's mobile device via the visited wireless network.

43. The method as in claim 42, wherein the step of delivering calls to the user's mobile device via the bypass means further comprises:

receiving a response over-the-air from the user's mobile device by the visited wireless network;

conversion of the response to packets by the visited wireless network;

forwarding the packets via the established bypass means; and reassembling the forwarded packets into a reassembled circuit call response for delivery by the voice and data service provider's network.

44. A method to bypass Global Systems for Mobile Communications (GSM) Memorandum of Understanding (MoU) to provide basic wireless call delivery service for a user having a mobile device and subscribing to a home wireless service provider serving a home wireless network, wherein the user roams to visit an area served by a visited wireless service provider serving a visited wireless network distinct and separate from the home wireless network, wherein there does not exist a pre-arranged GSM MoU between the home wireless service provider and the visited wireless service provider, and wherein the user has a payment means to pay for the basic wireless call delivery service, the method comprising:

establishing a PSTN bypass, having a first end and a second end, for conveying packets in both directions between the first end and the second end, independently of an existing Public Switched Telephony Network (PSTN), an existing GSM MAP network, and an existing ANSI-41 network;

delivering calls to the user's mobile device via the PSTN bypass;

collecting billing information from the visited wireless network by the visited wireless service provider; and billing the user by the visited wireless service provider responsive to the billing information collected and the user's identified payment means.

45. The method as in claim 44, wherein the PSTN bypass is an IP network.

46. The method as in claim 44, wherein the PSTN bypass is an IP tunnel.

47. The method as in claim 44, wherein the user's payment means comprises credit card information and wherein the step of identifying the user's payment means to the visited wireless service provider further comprises:

establishing a Diffie-Hellman temporary shared secret between the user's mobile device and the visited wireless network;

securely transmitting the user's credit card information to the visited wireless service provider via the visited wireless network using the temporary shared secret; and verifying the validity of the user's credit card information by the visited wireless service provider.

48. The method as in claim 47, wherein the step of securely transmitting the user's credit card information further comprises retrieving previously stored credit card information within the user's mobile device.

49. The method as in claim 47, wherein the step of securely transmitting the user's credit card information further comprises the user entering credit card information into the user's mobile device.

50. The method as in claim 44, wherein the step of establishing the PSTN bypass further comprises the method:

registering with the home wireless network to establish the first end of the PSTN bypass within the home wireless network;

identifying the user's payment means to the visited wireless service provider; and registering with the visited wireless network to establish the second end of the PSTN bypass within the visited wireless network.

51. The method as in claim 50, wherein the step of registering with the user's home wireless network to establish the first end of the PSTN bypass within the home wireless network further comprises setting up call forwarding from the home wireless network to a voice and data service provider's network.

52. The method as in claim 51, wherein the step of setting up call forwarding from the home wireless network to a voice and data service provider's network further comprises:

obtaining from the voice and data service provider's network a telephone number for call forwarding;

obtaining the packet address corresponding to the voice and data service provider's network; and storing the packet address in the user's mobile device.

53. The method as in claim 52, wherein the step of registering with the visited wireless network to establish the second end of the PSTN bypass within the user's mobile device further comprises:

obtaining a dynamic packet address from the voice and data service provider's network using Dynamic Host Configuration Protocol (DHCP);

relaying the dynamic packet address to the user's mobile device;

authenticating the connection by the voice and data service provider's network and the user's mobile device; and establishing the PSTN bypass by the user's mobile device.

54. The method as in claim 53, wherein the step of establishing the PSTN bypass further comprises:

updating a phone-number-to-packet-address table in the voice and data service provider's network;

updating a packet-address-to-phone-number table in the visited wireless network.

55. The method as in claim 53, wherein the step of delivering calls to the user's mobile device via the PSTN bypass further comprises:

conversion of a circuit call for delivery to packets by the voice and data service provider's network;

forwarding the packets via the established PSTN bypass;

reassembling the forwarded packets into a reassembled circuit call by the visited wireless network; and transmitting the reassembled circuit call over-the-air to the user's mobile device via the visited wireless network.

56. The method as in claim 55, wherein the step of delivering calls to the user's mobile device via the PSTN bypass further comprises:

receiving a response over-the-air from the user's mobile device by the visited wireless network;

conversion of the response to packets by the visited wireless network;

forwarding the packets via the established PSTN bypass; and reassembling the forwarded packets into a reassembled circuit call response for delivery by the voice and data service provider's network.

* * * * *